United States Patent [19]

Goranflo

[11] Patent Number: 4,475,523

[45] Date of Patent: Oct. 9, 1984

[54] METHOD AND SYSTEM FOR PREHEATING FUEL

[76] Inventor: Richard J. Goranflo, 109 Long Leaf La., Altamonte Springs, Fla. 32701

[21] Appl. No.: 420,232

[22] Filed: Sep. 20, 1982

[51] Int. Cl.³ ............................................. F02M 31/00
[52] U.S. Cl. .................................... 123/557; 123/552; 123/549
[58] Field of Search .................. 123/557, 552, 549; 219/205, 206, 207; 261/142, 144, 145

[56] References Cited

U.S. PATENT DOCUMENTS

| | | | |
|---|---|---|---|
| 1,168,111 | 1/1916 | Pope | 123/557 |
| 1,319,718 | 10/1919 | Martin | 123/552 |
| 1,980,496 | 11/1934 | Musselwhite | 123/557 |
| 2,788,176 | 4/1957 | Andersen | 123/552 |
| 2,788,779 | 4/1957 | Mengelkamp | 123/552 |
| 3,913,543 | 10/1975 | Richard | 123/552 |
| 4,015,567 | 4/1977 | Zabenski | 123/557 |
| 4,044,742 | 8/1977 | Linder | 123/552 |
| 4,072,138 | 2/1978 | Hawkins | 123/557 |
| 4,146,002 | 3/1979 | Quinn | 123/557 |
| 4,249,501 | 2/1981 | Ehresmann | 123/552 |
| 4,312,317 | 1/1982 | Jewell | 123/557 |
| 4,323,044 | 4/1982 | Erwin | 123/557 |

Primary Examiner—Ronald H. Lazarus
Attorney, Agent, or Firm—Duckworth, Allen, Dyer & Pettis

[57] ABSTRACT

A method and system for preheating internal combustion engine fuel to an optimum temperature before introducing the fuel into the carburetion system. It has been found that an engine fuel such as gasoline will have an optimum temperature at the point of carburetion for maximum combustion efficiency. A heat exchanger extracts heat from hot engine coolant to add heat to the fuel. A thermostatic switch and solenoid valve controls coolant flow to maintain the optimum temperature. Thermal insulation is provided around the fuel supply system and the heat exchanger to prevent engine heat from causing the fuel temperature to exceed the optimum temperature.

4 Claims, 3 Drawing Figures

METHOD AND SYSTEM FOR PREHEATING FUEL

BACKGROUND OF THE INVENTION

1. Field of the Invention

The present invention relates to a gasoline preheater for internal combustion engines, and more particularly to a method and system for preheating gasoline to an optimum temperature for most efficient vaporization and combustion.

2. Description of the Prior Art

It has been well known in the prior art to preheat gasoline before introduction of the fuel into the carburetor. It is also well known to utilize the heat of the engine coolant to perform this function. A typical U.S. Pat. which discloses this concept is No. 4,083,340 issued to Furr, et al. Furr notes a number of earlier patents which also dealt with this problem. Furr teaches the use of a superheater having a chamber through which the gasoline passes on its way from the storage tank to the carburetor with a copper coil disposed within the chamber through which heated coolant from the radiator of the engine is passed. An orifice is included in the line carrying the hot liquid coolant which is calibrated to provide a desired flow of coolant to heat the fuel to a preselected temperature. Although Furr states that the calibrated orifice can be changed to select the desired gasoline temperature, he states that the superheater increased the gasoline mileage on automobiles tested when the temperatures were maintained at any selected temperature from 100° to 225° F. but notes that the best results depend on the composition of the gasoline being used. He found that about 140° F. was optimum in his tests.

I have investigated the use of preheaters for improving the performance of gasoline engines and have found that the temperature of the fuel is quite critical with present day gasoline compositions. One problem which apparently has not been forseen by Furr or by any of the other prior workers in this field is that the ambient air temperature, the load on the engine, the location of the fuel pump and fuel lines in relation to the exhaust manifold, the amount of cooling air from the engine fan, and similar factors often control the minimum temperature of the fuel. For example, if the device of Furr were used in a high performance engine operating under heavy loads in hot weather and a desired temperature of 140° F. was required, it is quite possible for the fuel to be at a higher temperature from the engine heat as well as the ambient air temperature. Therefore, the superheater of Furr would be useless.

Another problem with the Furr-type device is that the selected fuel temperature is not easily controlled. For example, I have found experimentally that present day fuel compositions produce optimum fuel economy when the fuel in the carburetor float chamber is about 120° F. Thus, it is apparent that the gasoline producers vary their volatile components from time to time. To change the Furr superheater temperature, it would be necessary to disassemble the device and to replace the calibrated orifice. The use of the calibrated orifice also assumes that the coolant temperature is constant and the flow of that coolant is constant, a situation that would seldom, if ever, be realized in a practical automobile.

Thus, there is a need for a gasoline preheater which can accurately control the temperature of the fuel as it flows into the carburetor, which is easily adjustable to suit the composition of the fuel being used, which will not be influenced by engine and ambient heat, and which provides a means for accurately maintaining the correct temperature.

SUMMARY OF THE INVENTION

The preheater system of my invention includes a heat exchanger having a chamber through which the engine coolant is circulated by tapping off from the automobile heater supply and return lines. A solenoid valve is installed in a feed line to the chamber and is controlled by a sensitive precision thermostat having a bulb immersed in the chamber. The coolant inlet line into the chamber is in the form of a J-tube such that the incoming coolant is directed at the temperature thermostat bulb to cause it to quickly sense variations in coolant temperature such as will normally occur in an operating engine. The solenoid valve is preferably installed in the outlet coolant line from the chamber with the solenoid operated from the thermostatic switch. Therefore, the flow of coolant is cut off when the desired temperature is reached but is quickly restarted when the coolant in the chamber drops below the preselected temperature. A helical metal heat exchange tube, preferably copper, is disposed within the coolant chamber and connected between the engine fuel pump and the carburetor fuel inlet. Therefore, all fuel from the tank flows through the helical coil on its way to the carburetor. Sufficient surface area of the helical coil is provided to ensure that the fuel flowing through the coil is at essentially the same temperature as the coolant in the chamber for the maximum fuel flow rate.

As noted above, a preheat system will not operate properly if the temperature in the engine compartment of the automobile is higher than the selected fuel temperature since such circumstance can heat the gasoline in the fuel pump and the fuel lines to the carburetor, as well as in the carburetor float chamber. Advantageously, I insulate all of these components, preferably with a foam-type insulation to prevent the heat in the engine compartment from affecting the fuel as it flows from the tank to the carburetor.

It is a principal object of my invention to provide a system for preheating the fuel to the carburetor of an internal combustion engine to an optimum temperature for maximum efficiency of the engine.

It is another object of my invention to provide a preheat system which is easily adjustable to suit the fuel being used by the engine.

It is yet another object of my invention to provide a fuel preheat system having means to prevent excessive heating of the fuel from ambient temperature conditions around the engine.

It is still another object of my invention to provide a fuel preheat system for an automobile engine using a reservoir into which hot engine coolant is directed having a heat exchange coil immersed therein through which the fuel flows from the fuel pump to the carburetor.

It is a further object of the invention to control the flow of coolant into the reservoir by means of a solenoid valve controlled by an adjustable thermostat having its temperature sensitive element immersed in the coolant in the reservoir.

It is still a further object of my invention to provide a fuel preheat system for gasoline engines which will permit accurate control of the temperature of the fuel in the carburetor float chamber at a temperature which will produce optimum efficiency of the engine and thereby decrease the fuel consumption of the automobile.

These and other objects and advantages of my invention will become apparent from the following detailed description when read in conjunction with the drawings.

DETAILED DESCRIPTION OF THE PREFERRED EMBODIMENT

Figure 1:
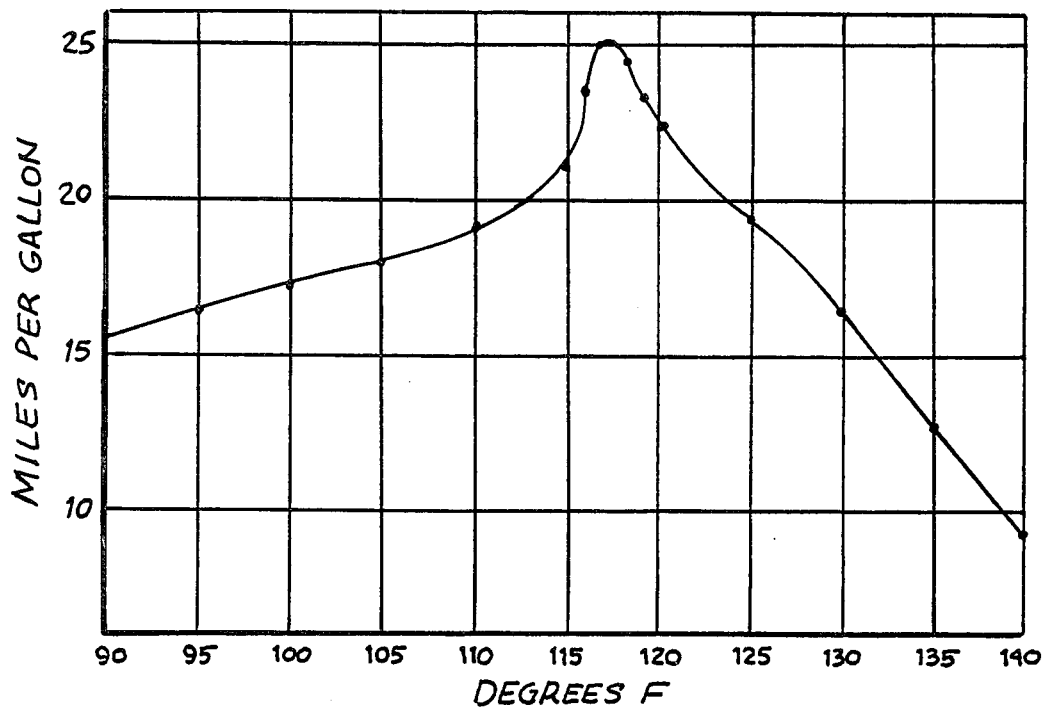
FIG. 1 is a typical plot of miles per gallon obtained in a test vehicle utilizing the fuel preheat system of the invention, the graph showing the optimum fuel temperature and the sharpness of the curve about this optimum temperature.

Referring first to FIG. 1, the results of a typical experiment using a test vehicle in which the temperature of the fuel in the carburetor float chamber can be varied over a wide range. The graph plots the fuel temperature versus miles per gallon. These results were obtained from tests utilizing a 1977 Cadillac coupe de ville having a 425 CID engine. Two persons were in the automobile during the test with the air conditioning equipment operating. The test runs were made in Florida in March, 1982 with an average outside temperature of about 85° F. at a speed of 55 mph. A Prince mileage computer was installed on the vehicle and was previously calibrated.

As may be noted from the graph of FIG. 1, a sharp increase in miles per gallon was obtained between 115° and 120° F. with the optimum mileage of 25 miles to the gallon obtained at approximately 117° F. The efficiency of the engine decreased rapidly above 120° F. dropping to about 9 miles per gallon at 140° F. The fuel temperature was controlled during the test by means of the fuel preheat system of my invention to be described in more detail below. Without the system of the invention installed, this vehicle averages a fuel consumption of about 17 miles per gallon at 55 miles per hour under the conditions of the above described tests.

As may be understood from the graph of FIG. 1, there exists an optimum fuel temperature with respect to fuel economy and that such point falls within a narrow range of temperatures. Of particular importance is that excessive fuel temperatures result in a decrease of efficiency indicating that a practical system must be able to prevent engine heat and ambient air temperatures from fortuitously raising the fuel temperature much above the optimum value.

Figure 2:
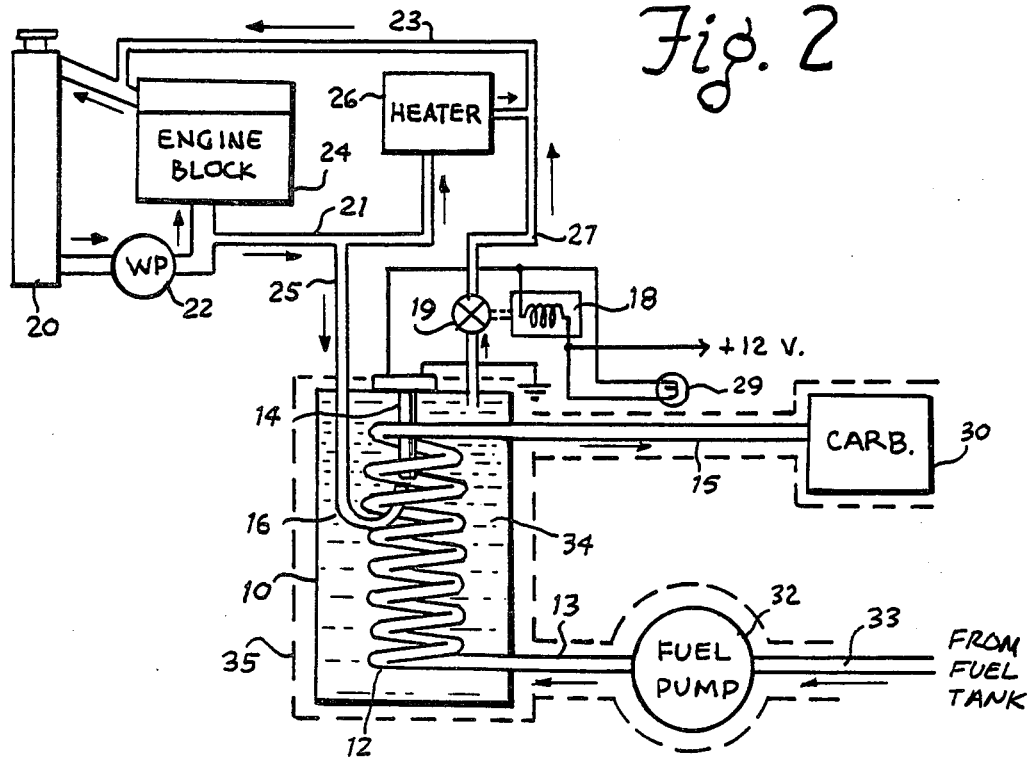
FIG. 2 is a schematic diagram of the fuel preheat system of the invention installed on an automobile.

FIG. 2 is a schematic diagram of my fuel preheater system as applied to a typical automobile engine. Radiator 20 contains the normal engine coolant which is circulated through engine block 24 by water pump 22. As is also conventional, the heater 26 for the vehicle utilizes a portion of the circulating coolant which enters the heater via line 21 and returns via line 23.

In accordance with my invention, I utilize heat exchanger 10 to provide the desired fuel temperature. A coolant inlet line 25 is tapped off of the heater line 21 and connects to J-tube 16 in heat exchanger 10. Outlet line 27 from heat exchanger 10 connects to heater return line 23. A valve 19 is controlled by solenoid 18 to open or close line 27. With the engine operating and solenoid valve 19 open, heated coolant will flow through line 25 and J-tube 16 to fill the body of heat exchanger 10 with coolant 34. This coolant will circulate then from line 25 through line 27 back to the engine system. Although the solenoid valve formed by valve 19 and solenoid 18 may be any suitable type, I have found that a 12 volt dc manufactured by Airmatic Allied, part no. 20385 is well suited for this use.

Also, installed in heat exchanger 10 is a thermostatic control switch 14 which is adjustable over a range of temperatures. There are various such thermostatic switches available commercially. A Fenwal part no. 17100 has been found to give excellent results in this application. Thermostatic switch 14 is connected in series with solenoid 18 to the battery supply of the vehicle. When thermostatic switch 14 is closed, solenoid valve 19 is open to permit coolant flow. When the temperature of the coolant 34 in heat exchanger 10 reaches the setting of thermostat 14, the switch opens, closing solenoid valve 19. This cuts off the flow of coolant. Assume that the temperature of coolant 34 drops below the setting of thermostatic switch 14; the switch will then close operating solenoid 18 and opening solenoid valve 19, permitting coolant flow to start. It will be noted that J-tube 16 is disposed such that the initial flow of coolant from line 25 will strike the bulb of thermostatic switch 14, ensuring a minimum delay or lag in sensing of the temperature.

Also disposed in heat exchanger 10 is helical coil 12 which is preferably formed from copper tubing. Helical coil 12 is connected to the outlet of fuel pump 32 by line 13 with the opposite end connected to carburetor 30 by line 15. As may now be noted, fuel from the fuel tank is pumped by fuel pump 32 via line 33 through helical coil 12 to carburetor 30. Heat from coolant 34 is transferred through the walls of helical coil 12 to raise the temperature of the fuel flowing therethrough. The size and length of helical coil 12 is selected for the maximum rate of fuel flow to permit sufficient heat transfer to maintain the desired fuel temperature. For example, a 5/16" by 10' copper tube has been found to be suitable. An optional pilot lamp 29 may be connected across solenoid 18 and installed in the dashboard of the vehicle to indicate to the operator that the preheater system is operating normally. I have found in tests that it is normal for the solenoid to open for short periods of about one second or so and to then close. 10 to 30 seconds later the solenoid may again open for a short period. Of course, the exact cycle would depend upon the driving conditions, speed, initial fuel temperature, load, and the like. For a typical installation, I have found that a transit time for fuel through helical coil 12 to be about 30 seconds which is sufficient to obtain the desired heat transfer.

To maintain the fuel at a optimum temperature which may be in the 120° F. region, it is necessary to prevent heat in the engine compartment from the exhaust manifold and from the block, as well as from the ambient air, from heating the fuel in the supply line 33, the fuel pump 32, the lines 33 from the fuel pump to the heat exchanger 10, and from the heat exchanger 10 to the carburetor 15 from being heated to a higher temperature than the optimum value. In some vehicles, heating of the fuel can also take place via the carburetor float chamber. To obviate this problem, I provide suitable insulation for these portions of the fuel system. I have found that expanded plastic or rubber foam jackets may be installed around lines 15 and 13 and, if necessary, line 33 and will effectively prevent heat transfer into those lines. The same type of material may be formed to cover fuel pump 32 and heat exchanger 10 as indicated at 35 by the dashed lines. In addition, where necessary, an expanded foam cover may be installed around the carburetor 30. Thus, insulation 35 permits the temperature of the fuel into the carburetor to be completely controlled by heat exchanger 10 and not to be influenced by engine and other heat sources.

Figure 3:
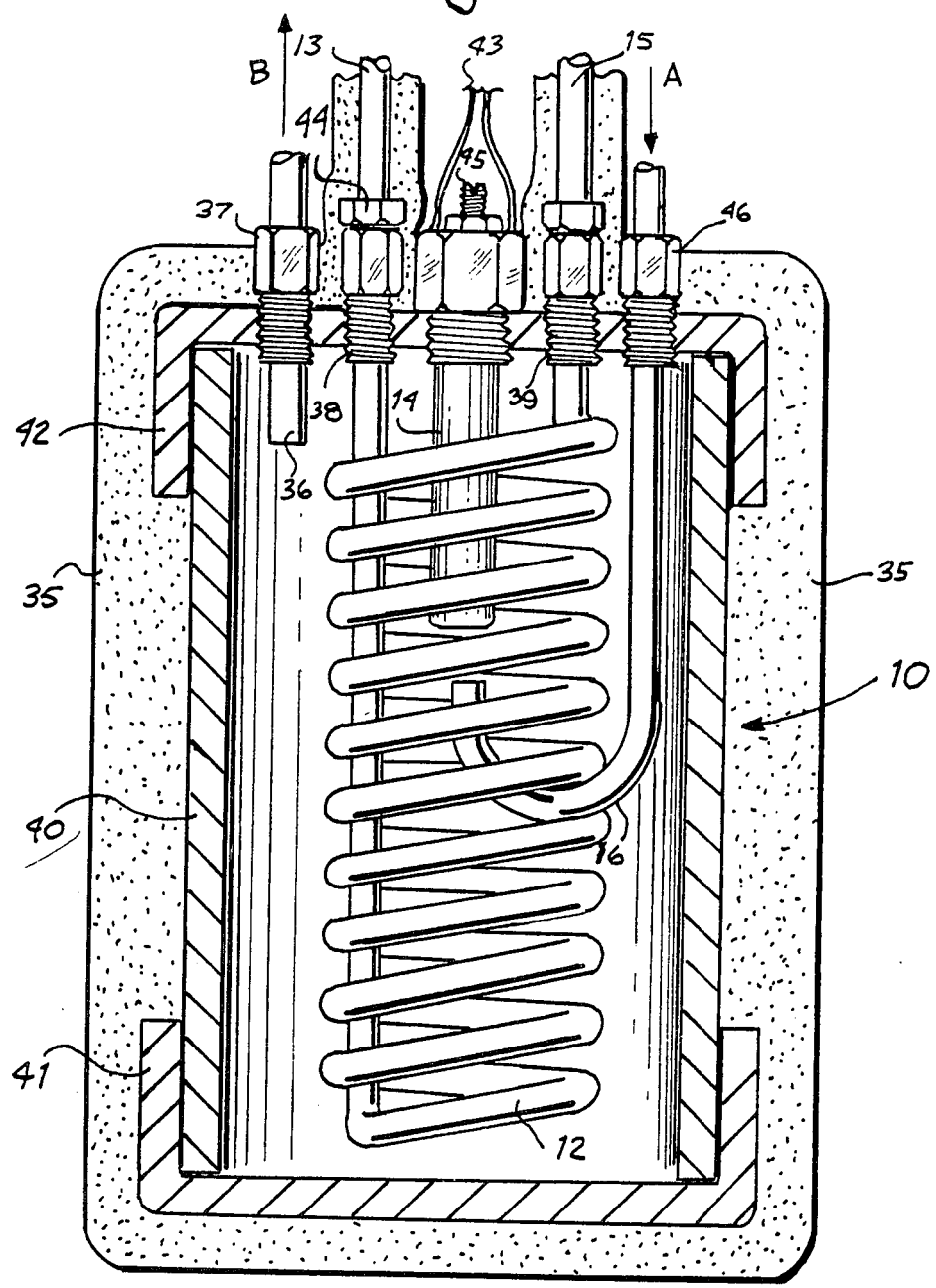
FIG. 3 is a cross sectional view of a preferred heat exchanger in accordance with my invention.

A cross sectional view of a preferred embodiment of heat exchanger 10 is shown in FIG. 3. A section of schedule 40 PVC pipe having a three inch inside diameter and a length of about six inches may be used for body 40. A bottom cap 41 is formed from a schedule 80 PVC three inch pipe cap suitably cemented to body 40. Similarly, top cap 42 is formed from a schedule 80 PVC three inch pipe cap 42 having a plurality of drilled and tapped holes therethrough. Standard compression fittings 37, 38, 39, and 46 are installed in cap 42. The ends of helical coil 12 may be soldered or welded into fittings 38 and 39 which serve to suppot helical coil 12 within the heat exchanger 10. A short length of tubing 36 soldered into fitting 37 provides an outlet for the coolant from the chamber of heat exchanger 10 while inlet J-tube 16 may be soldered into fitting 46 as shown. Alternatively, fittings 37, 38, 39 and 46 may be drilled so that the tubes will pass completely through the fittings and directly to the fuel elements and coolant connections. A ferrule and compression nut, such as nut 44, is used with each tube to seal each fitting. Thermostatic valve 14 is installed through cap 42 such that its bulb is adjacent the open end of J-tube 16 as previously described. Leads 43 from the switch portion of thermostatic switch 14 are shown which will connect to the solenoid valve circuit. Thermostatic switch 14 includes an adjustment screw 45 having a suitable locknut which permits adjustment of the control temperature over a wide range. The coolant flow is into fitting 46 as indicated by arrow A and flows out of the heat exchanger 10 via fitting 37 as shown by arrow B. Also shown in partial view is fuel inlet line 13 connected to fitting 38 and outlet fuel line 15 connected to fitting 39. The entire heat exchanger 10 and lines 13 and 15 are encased in a suitable insulating material 35 such as expanded foam rubber, plastic or the like as described above. Any suitable mounting clamps may be provided for heat exchanger 10 for mounting in the vehicle engine compartment.

As may now be recognized, a novel fuel preheat system for maintaining fuel for an internal combustion engine at its optimum temperature for most efficient combustion has been disclosed. Means are provided to prevent engine and ambient heat from raising the fuel temperature above the optimum value and a heat exchanger utilizing the hot engine coolant to preheat the fuel to the optimum value. The heat exchanger utilizes a thermostatic device to control the coolant flow through the heat exchanger. Advantageously, the thermostatic device is adjustable. The optimum fuel temperature is a function of the fuel composition which may differ seasonally and geographically. Thus, the user may experimentally determine the optimum temperature by varying the thermostatic device setting and noting the setting that produces minimum fuel consumption.

The method of my invention may be seen to utilize the steps of determining the optimum temperature for the composition of fuel being used with respect to combustion efficiency, maintaining the fuel from the supply tank and fuel pump to the carburetor at a temperature equal to or less than the determined optimum temperature, providing a heat exchanger for extracting heat from hot engine coolant for maintaining the fuel to the carburetor at essentially the optimum temperature, controlling the flow of hot coolant through the heat exchanger, and feeding the preheated fuel to the carburetor.

Although a specific embodiment of my system has been disclosed, it will be obvious to those of skill in the art to substitute equivalent elements and to make various modifications without departing from the spirit and scope of my invention.

I claim:

1. A fuel preheat system for an internal combustion engine having a liquid coolant, coolant pump, coolant system return, fuel pump, and a carburetor with float chamber, comprising:
   (a) a heat exchanger having
      i. a chamber for holding engine coolant,
      ii. an inlet for connection to the engine coolant pump for introducing hot coolant into said chamber,
      ii. an outlet for connection to the engine coolant system return,
      iv. a helical tubular coil disposed in said chamber having an inlet for connection to the engine fuel pump and an outlet for connection to the carburetor float chamber, said helical coil in heat transfer relationship to said hot coolant in said chamber for heating fuel flowing therethrough;
   (b) a solenoid operated valve connected between said coolant inlet of said chamber and said engine coolant system return for selectively controlling the flow of hot engine coolant through said chamber;
   (c) an adjustable thermostatic switch having a heat sensitive bulb disposed in said chamber, said thermostatic switch connected to said solenoid operated valve for closing said valve when the temperature of the hot coolant in said chamber is greater than a selected adjustment thereof and opening said valve when the temperature of the hot coolant in said chamber is less than the selected adjustment thereof;
   (d) a J-tube disposed within said chamber and connected to said coolant inlet with an open end adjacent said bulb; and
   (e) thermal insulation surrounding the engine fuel pump, said line to said fuel pump, said line to said float chamber and said heat exchanger chamber.

2. The system as defined in claim 1 in which said chamber for holding engine coolant includes:
   a straight section of polyvinyl chloride pipe;
   a first polyvinyl chloride pipe cap attached to a first end of said pipe; and
   a second polyvinyl chloride pipe cap attached to the second end of said pipe, said second cap having a first compression fitting forming said coolant inlet, a second compression fitting forming said coolant outlet, a third compression fitting connected to said helical tubular coil forming said fuel inlet thereof, and a fourth compression fitting connected to said helical tubular coil forming said fuel outlet.

3. The system as defined in claim 1 in which said helical tubular coil is formed from copper tubing.

4. The system as defined in claim 1 in which said thermal insulation is formed of expanded foam rubber.

* * * * *